(12) United States Patent
Tan et al.

(10) Patent No.: US 10,670,909 B2
(45) Date of Patent: Jun. 2, 2020

(54) DISPLAY DEVICE AND DISPLAY METHOD OF DISPLAY DEVICE

(71) Applicant: BOE TECHNOLOGY GROUP CO., LTD., Beijing (CN)

(72) Inventors: Jifeng Tan, Beijing (CN); Wenqing Zhao, Beijing (CN); Wei Wang, Beijing (CN); Xiandong Meng, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 57 days.

(21) Appl. No.: 16/027,518

(22) Filed: Jul. 5, 2018

(65) Prior Publication Data

US 2019/0033656 A1    Jan. 31, 2019

(30) Foreign Application Priority Data

Jul. 28, 2017    (CN) .......................... 2017 1 0631926

(51) Int. Cl.
| | |
|---|---|
| *G02F 1/1335* | (2006.01) |
| *F21V 8/00* | (2006.01) |
| *G09G 3/36* | (2006.01) |
| *G02F 1/1343* | (2006.01) |
| *G02F 1/29* | (2006.01) |

(Continued)

(52) U.S. Cl.
CPC ..... *G02F 1/133528* (2013.01); *G02B 6/0031* (2013.01); *G02B 6/0056* (2013.01); *G02F 1/1343* (2013.01); *G02F 1/133553* (2013.01); *G02F 1/29* (2013.01); *G09G 3/3696* (2013.01); *G02F 1/13306* (2013.01); *G02F 2001/133616* (2013.01); *G02F 2201/128* (2013.01); *G02F 2201/30* (2013.01); *G02F 2203/02* (2013.01); *G02F 2203/62* (2013.01)

(58) Field of Classification Search
CPC ...................................... G02F 1/1335
See application file for complete search history.

(56) References Cited

U.S. PATENT DOCUMENTS

| | | | | |
|---|---|---|---|---|
| 6,738,115 | B1* | 5/2004 | Iijima | G02F 1/133555 349/113 |
| 2006/0250541 | A1* | 11/2006 | Huck | F21V 14/003 349/61 |

(Continued)

*Primary Examiner* — Sang V Nguyen
(74) *Attorney, Agent, or Firm* — Dilworth & Barrese, LLP.; Michael J. Musella, Esq.

(57) ABSTRACT

A display device and a display method thereof are disclosed. The display device includes a light guide module and a polarization layer, a light direction control section, a reflective layer sequentially disposed on a side of the light guide module. The light guide module includes a first major surface and a second major surface that are opposite to each other, and the first major surface includes first regions for emitting light and second regions, the polarization layer includes polarizers corresponding to the first regions, and the polarizers have a first polarization direction, and the light direction control section is configured to control light direction to adjust a passing amount of the light reflected by the reflective layer in the non-light exiting regions and make the light have a second polarization direction substantially perpendicular to the first polarization direction after passing through the light direction control section.

16 Claims, 7 Drawing Sheets

(51) Int. Cl.
    *G02F 1/133*     (2006.01)
    *G02F 1/13357*     (2006.01)

(56) References Cited

U.S. PATENT DOCUMENTS

| | | | |
|---|---|---|---|
| 2015/0062497 A1* | 3/2015 | Nam | G02F 1/133536 |
| | | | 349/96 |
| 2016/0097893 A1* | 4/2016 | Sohn | G02F 1/133615 |
| | | | 349/65 |
| 2016/0178832 A1* | 6/2016 | Hsiao | G02B 6/0066 |
| | | | 349/12 |
| 2017/0031170 A1* | 2/2017 | Yang | G02F 1/1336 |
| 2017/0131593 A1* | 5/2017 | Tang | G02F 1/133528 |
| 2018/0173052 A1* | 6/2018 | Shinohara | G02F 1/133602 |
| 2019/0094575 A1* | 3/2019 | Wang | G02F 1/29 |
| 2019/0285902 A1* | 9/2019 | Ouderkirk | G02B 27/0955 |

\* cited by examiner

DISPLAY DEVICE AND DISPLAY METHOD OF DISPLAY DEVICE

CROSS-REFERENCE TO RELATED APPLICATION

The present application claims priority of the Chinese patent application No. 201710631926.4, filed on Jul. 28, 2017, the disclosure of which is incorporated herein by reference as part of the application.

TECHNICAL FIELD

At least one embodiment of the present disclosure relates to a display device and a display method of the display device.

BACKGROUND

With the development of science and technology and the progress of society, proportion of time taken by electronic display products in people's daily life is increasing, and accordingly, people have further demands for functions of the electronic display products. However, due to limitation by the current structural design, light utilization rate of the electronic display products is low, and also the display effect thereof cannot satisfy user's needs. For example, if the electronic display products is reflective liquid crystal display devices, light for display passes twice through structures such as the polarizers and the like in the liquid crystal display devices, and the structures such as the polarizers and the like reduce light transmittance and make the light utilization rate very low, increasing power consumption and adversely affecting brightness of displayed images, and limiting development of the electronic display products in field of transparent display.

SUMMARY

At least one embodiment of the present disclosure provides a display device, the display device comprises a light guide module, a polarization layer, a light direction control section and a reflective layer, and the light guide module comprises a first major surface and a second major surface that are opposite to each other, and first regions and second regions are defined on the first major surface, the polarization layer is disposed on a side of the first major surface away from the second major surface and comprises a plurality of polarizers disposed at intervals, an orthographic projection of the polarizers on the first major surface at least partially overlaps with the first regions, and the light direction control section is disposed on a side of the polarization layer away from the light guide module, and the reflective layer is located on a side of the light direction control section away from the polarizing layer, and light emitted from the first major surface in the light guide module emits from first regions, and the polarizers are configured to make transmitted light have a first polarization direction, and the light direction control section is configured to control direction of light to adjust a passing amount of the light reflected by the reflective layer in the non-light exiting regions, and the light direction control section is configured to make the light reflected by the reflective layer have a second polarization direction substantially perpendicular to the first polarization direction after passing through the light direction control section.

For instance, in the display device according to at least one embodiment of the present disclosure, a plurality of the first regions and a plurality of the second regions are defined on the first major surface, and the plurality of first regions and the plurality of second regions are arranged in an array and disposed at intervals.

For instance, in the display device according to at least one embodiment of the present disclosure, the polarizers are disposed in a one-to-one correspondence with the first regions, and each of the first regions coincides with an orthogonal projection of one corresponding polarizer on the first major surface or each of the first regions is located in an orthogonal projection of one corresponding polarizer on the first major surface.

For instance, in the display device according to at least one embodiment of the present disclosure, the display device comprises a plurality of pixel regions, each of the pixel regions comprises one non-display area corresponding to one first region and two display areas corresponding to two second regions, and the non-display is located between the two display areas in each of the pixel regions.

For instance, in the display device according to at least one embodiment of the present disclosure, the light direction control section comprises a liquid crystal layer and a liquid crystal control electrode, and the liquid crystal control electrode is configured to make the liquid crystal layer forming a liquid crystal grating after a voltage is applied by the liquid crystal control electrode.

For instance, in the display device according to at least one embodiment of the present disclosure, a product of a thickness and an optical anisotropy of the liquid crystal layer is about one fourth of a wavelength of the light emitted from the light guide module.

For instance, in the display device according to at least one embodiment of the present disclosure, the light direction control section further comprises a quarter-wave plate located between the polarizing layer and the reflective layer.

For instance, in the display device according to at least one embodiment of the present disclosure, the light guide module further comprises a light guide plate, a light supply section and a light extraction layer, and the light guide plate comprises two opposite major surfaces and a first side surface located between the two major surfaces, and the two main surfaces are the first major surface and the second major surface respectively, and the light supply section is disposed opposite to the first side surface to inject light into the light guide plate, and the light extraction layer is located on the first major surface or the second major surface and configured to derive the light emitted from the light supply section into the light guide plate.

For instance, in the display device according to at least one embodiment of the present disclosure, the light extraction layer comprises a plurality of light extraction units disposed at intervals, and orthographic projections of the light extraction units on the first major surface coincide with the first regions.

For instance, in the display device according to at least one embodiment of the present disclosure, the light extraction layer is a light extraction grating.

For instance, in the display device according to at least one embodiment of the present disclosure, the light extraction grating is a transmission grating and the transmission grating is located on the first major surface; or the light extraction grating is a reflection grating and the reflection grating is located on the second major surface.

For instance, in the display device according to at least one embodiment of the present disclosure, the light emitted from the light extraction grating is polarized light, and the polarized light has the first polarization direction.

For instance, in the display device according to at least one embodiment of the present disclosure, the light extraction layer is configured to make a propagation direction of the light emitted from the light guide plate to be perpendicular to the first major surface.

For instance, in the display device according to at least one embodiment of the present disclosure, the light guide module further comprises at least one total reflective layer, the at least one total reflective layer is located on the first major surface and/or the second major surface.

For instance, in the display device according to at least one embodiment of the present disclosure, the light supply section further comprises a side entry light source and a coupling grating, the coupling grating is configured to adjust a propagation direction of the light emitted from the side entry light source to make the light emitted from the side entry light source be totally reflected in the light guide plate.

For instance, in the display device according to at least one embodiment of the present disclosure, the side entry light source is a lambert light source.

For instance, in the display device according to at least one embodiment of the present disclosure, the coupling grating comprises a curved reflective mirror, and a shape of a sectional view of the curved reflective mirror in a direction perpendicular to the first major surface is a part of a parabola, and the side entry light source is located at a focus of the parabola.

For instance, in the display device according to at least one embodiment of the present disclosure, the reflective layer comprises a plurality of reflective units disposed at intervals, and the reflective units are in one-to-one correspondence with the polarizers.

For instance, in the display device according to at least one embodiment of the present disclosure, an orthographic projection of the reflective unit on the first major surface coincides with an orthographic projection of the corresponding polarizer on the first major surface; or an orthographic projection of the reflective unit on the first major surface is located within an orthographic projection of the corresponding polarizer on the first major surface.

At least one embodiment of the present disclosure provides a display method of the display device, the display method comprises: a first display state, wherein the light having the first polarization direction that is emitted by the first regions of the light guide module and transmitted through the polarizer is reflected by the reflective layer after passing through the light direction control section, and the light reflected by the reflective layer has the second polarization direction after passing through the light direction control section again and is directed toward the polarizer; and a second display state, wherein the light direction control section is controlled to change a propagation direction of the light that is emitted from the first regions of the light guide module and transmitted through the polarizer, and the light direction control section makes at least part of the light reflected by the reflective layer be directed to the second regions.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
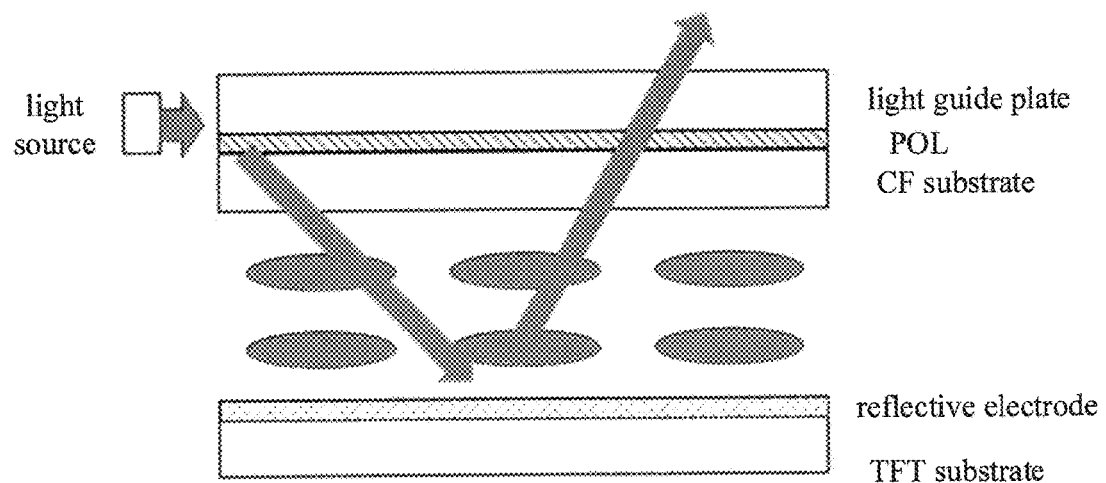
FIG. 1 is a schematic structural diagram of a conventional reflective LCD.

A conventional reflective LCD structure comprises a light source, a light guide plate, a polarizer (POL), a color film substrate (CF substrate), a liquid crystal layer, a reflective electrode of planar shape, and a thin film transistor (TFT) substrate, and the schematic structural diagram of this reflective LCD structure can be referred to FIG. 1. Principle of this reflective LCD is as follows. The front light source is turned off and ambient light is used for display when the external ambient light is strong, and the front light source is turned on and the light of the front light source is used for display in the dark room. However, incident light needs to pass through the polarizer twice during display process, transmittance rate of the light is only about 33%, and the light transmittance rate is low; and background light cannot pass through the display device and the transparent display is not be realized because the reflective planar electrode is provided.

At least one embodiment of the present disclosure provides a display device, the display device comprises a light guide module, a polarization layer, a light direction control section and a reflective layer, and the light guide module comprises a first major surface and a second major surface that are opposite to each other, and first regions and second regions are defined on the first major surface, the polarization layer is disposed on a side of the first major surface away from the second major surface and comprises a plurality of polarizers disposed at intervals, an orthographic projection of the polarizers on the first major surface at least partially overlaps with the first regions, and the light direction control section is disposed on a side of the polarization layer away from the light guide module, and the reflective layer is located on a side of the light direction control section away from the polarizing layer, and light emitted from the first major surface in the light guide module emits from first regions, and the polarizers are configured to make transmitted light have a first polarization direction, and the light direction control section is configured to control the direction of light to adjust the passing amount of the light reflected by the reflective layer in the non-light exiting regions, and the light direction control section is configured to make the light reflected by the reflective layer have a second polarization direction substantially perpendicular to the first polarization direction after passing through the light direction control section.

In above-mentioned embodiment, given that the area of the second regions is fixed, the brightness of the portion of the display device corresponding to the second regions is greater if the amount of the light passing through the second regions is greater, thus the light direction control section is able to control display gray scale of the display device by adjusting the light passing amount in the non-light exiting regions.

In the display device of the above-mentioned embodiment, in the process that the light emitted from the light guide module is emitted to the reflective layer, is reflected by the reflective layer and then is directed to the light guide module, the light direction control section is able to control propagation direction of the light and allow the light reflected by the reflective layer to be directed to the first regions or the second regions, so the passing amount of the light in the second regions is adjusted, and the control of the display gray scale of the display device is realized. In the display device, the light emitted from the second regions needs not pass through the polarizers twice, increasing the transmittance rate of the light, thereby improving brightness of the display images.

For example, in at least one embodiment of the present disclosure, the second major surface of the light guide module corresponds to a display side of the display device, for example, further to be a display surface of the display device. For example, for light emitted from the first major surface of the light guide module, the light emits from the first regions of the first major surface and does not emit from the second regions of the first major surface.

For example, in some embodiments of the present disclosure, the display device can be configured as a transparent display device. For example, in the display device, the background light from behind the display device can be emitted from the second regions of the light guide module, so the display device can "display" background images, that is, the user is able to watch the background images behind the display device through the display device. In the display device, the background light emitted from the second regions needs not pass through the polarizers, so the transmittance rate of the background light increases, thereby improving the effect of the transparent display device. For example, in a case where the display device is a transparent display device, the display images of the display device are able to be constituted by the light emitted from the light guide module and the background light.

For example, in some other embodiments of the present disclosure, the display device can be configured as a non-transparent display device. For example, the background light is not able to enter the light guide module and then exit from the second regions of the light guide module, and the display images of the display device are only composed by the light emitted from the light guide module.

In the following, a display device and a display method thereof according to at least one embodiment of the present disclosure will be described in detail with reference to accompanying drawings. In addition, the display device in at least one of the following embodiments is a non-transparent display device and the light in the related description is derived from the light guide module, unless explicitly stated.

Figure 2A:
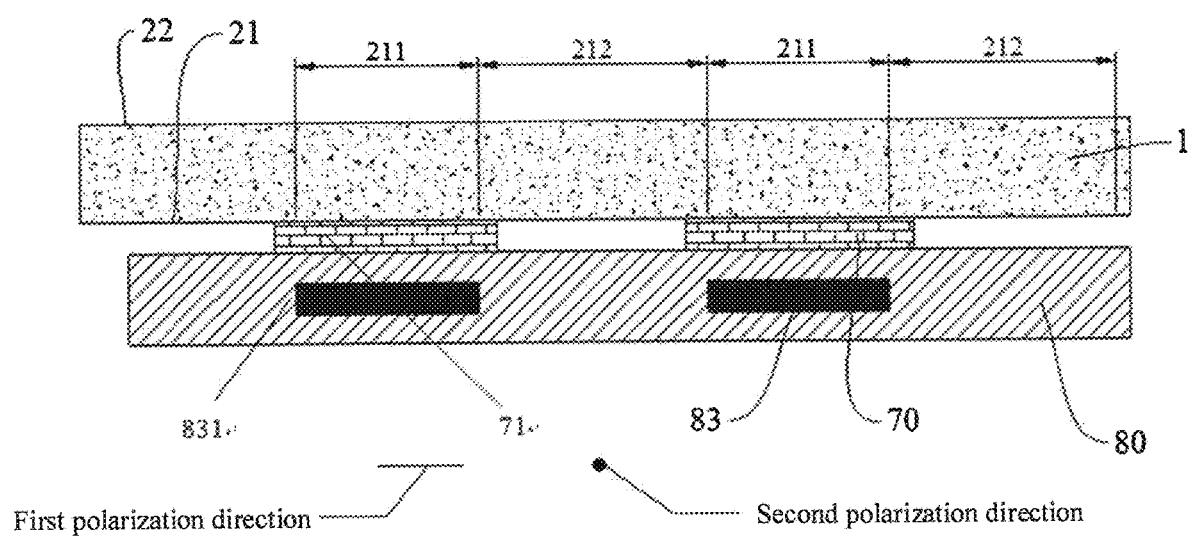
FIG. 2A is a schematic structural diagram of a display device according to an embodiment of the present disclosure.

FIG. 2A is a schematic structural diagram of a display device according to an embodiment of the present disclosure.

For example, in the display device according to at least one embodiment of the present disclosure, as shown in FIG. 2A, the display device comprises a light guide module 1, a polarization layer 70, a light direction control section 80 and a reflective layer 83, and the light guide module 1 comprises a first major surface 21 and a second major surface 22 that are opposite to each other, and a first regions 211 and a second regions 212 are defined on the first major surface 21, the polarization layer 70 is disposed on a side of the first major surface 21 away from the second major surface 22 and comprises a plurality of polarizers 71 disposed at intervals, an orthographic projection of the plurality of polarizers 71 on the first major surface 21 covers the first regions 211, and the light direction control section 80 is disposed on a side of the polarization layer 70 away from the light guide module 1, and the reflective layer 83 is located on a side of the light direction control section 80 away from the polarizing layer 70. For example, an orthographic projection of the polarizers 71 on the first major surface 21 at least partially overlaps with the first regions 211 correspondingly. For example, the orthographic projection of the polarizers 71 on the first major surface 21 coincides with the first regions 211 correspondingly. Light in the light guide module 1 emits from the first regions 211, and the polarizers 71 are configured to make transmitted light have a first polarization direction, and the light direction control section 80 is configured to control the direction of light to adjust the passing amount of the light reflected by the reflective layer 83 in the non-light exiting regions 212, and the light direction control section 80 is configured to make the light reflected by the reflective layer 83 have a second polarization direction substantially perpendicular to the first polarization direction after passing through the light direction control section 80. The second major surface 22 faces users in the process of display.

The light emitted from the first regions 211 is irradiated to the reflective layer 83 through the polarizer and the light direction control section 80, and then is reflected by the reflective layer 83 and passes through the light direction control section 80, thereby implementing a reflective display mode; the propagation direction of the light is able to be changed by the light direction control section 80 when the light passes through the light direction control section 80 (for example, the liquid crystal grating in the following embodiments causes light to be diffracted), and the gray scale display is able to be achieved by adjusting the degree of change (for example, diffraction efficiency of the liquid crystal grating in the following embodiments) of the light direction by controlling the light direction control section 80. Moreover, the light whose propagation direction is changed is able to be emitted through gaps between the polarizers 71, so the light is able to be emitted from the non-light emit regions 212 of the light guide module 1, and the light needs not pass through the polarizers 71 twice, the transmittance rate and utilization of the light are greatly improved, thereby improving the brightness of the displayed images.

In at least one embodiment of the present disclosure, the first polarization direction and the second polarization direction may be completely perpendicular to each other, and may also be approximately perpendicular to each other. For example, in a case where the first polarization direction is completely perpendicular to the second polarization direction, an angle between the first polarization direction and the second polarization direction is 90 degrees. For example, in a case where the first polarization direction and the second polarization direction are approximately perpendicular, an angle between the first polarization direction and the second polarization direction may be between 80 degrees and 100 degrees, for example, further between 85 degrees and 95 degrees. In a case where the first polarization direction and the second polarization direction are not completely perpendicular, the range of the angle between the first polarization direction and the second polarization direction is not limited, as long as the influence of the passing amount of the light of the second polarization direction after passing through the polarizers having the first polarization direction upon the display effect of the display device is within an acceptable range.

In the following, taking the first polarization direction and the second polarization direction being perpendicular as an example, the technical solutions in at least one embodiment of the present disclosure will be described.

Figure 8A:
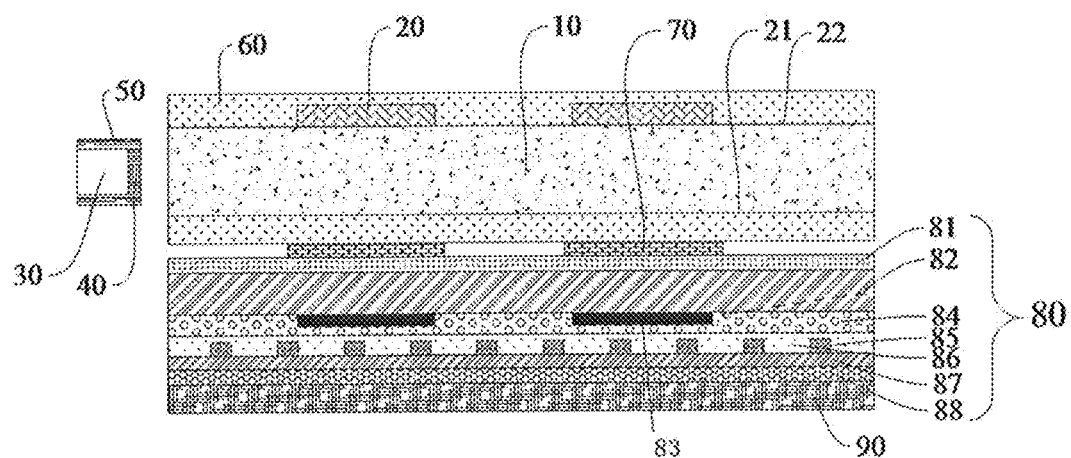
FIG. 8A is a schematic structural diagram of a display device according to further another embodiment of the present disclosure.
Figure 8B:
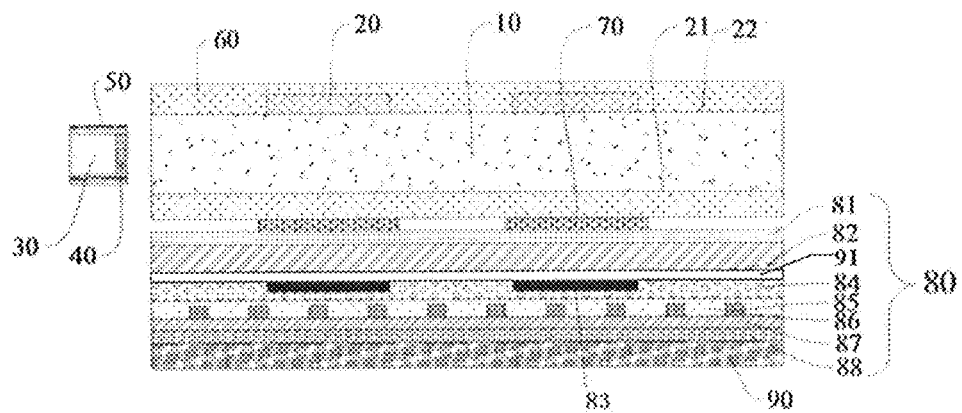
FIG. 8B is a schematic structural diagram of a display device according to further another embodiment of the present disclosure.

For instance, in at least one embodiment of the present disclosure, the light direction control section comprises a liquid crystal layer and a liquid crystal control electrode, and the liquid crystal control electrode is configured to make the liquid crystal layer form a liquid crystal grating after a driving voltage is applied. For example, in a case where no voltage is applied to the liquid crystal control electrode, the liquid crystal layer does not change the propagation direction of the light passing through; in a case where a voltage is applied to the liquid crystal control electrode, parameters such as twisting, refractive index and the like of the liquid crystal molecules in the liquid crystal layer due to the electric field generated by the liquid crystal control electrode can be controlled, so the liquid crystal layer forms a liquid crystal grating, diffracting the light passing through, thereby changing the propagation direction of the light, and part of the light is able to be emitted from the second regions after being reflected by the reflective layer. In addition, by controlling the voltage applied to the liquid crystal control electrode, the diffraction efficiency of the liquid crystal grating is able to be controlled, and the passing amount of the light through the second regions is able to be controlled, thereby the display gray scale of the display device can be controlled. The structure of the light direction control section can be referred to related contents in the embodiments as shown in FIG. 8A and FIG. 8B described below, and details are not described here.

For instance, in at least one embodiment of the present disclosure, a product of a thickness and an optical anisotropy of the liquid crystal layer is about one fourth of a wavelength of the light emitted from the light guide module. In this way, the light direction control section and the reflective layer cooperate to allow the light reflected by the reflective layer to have a second polarization direction perpendicular to the first polarization direction after passing through the light direction control section. The structure of the light direction control section of the liquid crystal layer having the above structure may be referred to the related content in the embodiments shown in FIG. 8A described below, and details are not described herein.

Exemplarily, the light in the light guide module is emitted through the light exit area on the first major surface, and then the light passes through the polarizers to become polarized light (linearly polarized light) and has a first polarization direction, the obtained polarized light sequentially passes through the light direction control section (liquid crystal layer), is reflected by the reflective electrode and again passes through the light direction control section (liquid crystal layer). In a case where a black state display is needed, the voltage applied to the liquid crystal layer in the liquid crystal grating module is controlled to make the entire liquid crystal layer be in a uniform state (that is, it does not have a grating effect), in this situation, the polarized light is able to directly pass through the liquid crystal layer and the linearly polarized light is changed to circularly polarized light, and the polarization direction of the circularly polarized light reflected by the reflective layer is opposite to that when the light is previously directed toward the reflective layer (for example, left-handed polarized light becomes right-handed polarized light, or right-handed polarized light becomes left-handed polarized light), and the circularly polarized light becomes linearly polarized light after passing through the liquid crystal layer again, in the above process, the polarization direction of the polarized light is rotated by 90 degrees, and the polarization direction of the light (having the second polarization direction) is perpendicular to the polarization direction (first polarization direction) of the polarizers when the light is propagated to the polarizer again, and the polarized light is absorbed by the polarizers to realize black state display. In a case where a non-black state display is needed, the light path is the same as when the black state is displayed, the difference is that the liquid crystal layer forms a liquid crystal grating by controlling the voltage applied to the liquid crystal control electrode when the polarized light passes through the light direction control section, and the liquid crystal grating diffracts the polarized light, and the liquid crystal grating module is able to have different diffraction efficiencies for the polarized light by applying different voltages, thereby achieving gray scale display. In the above embodiments, the diffracted light is emitted through the gap (corresponding to the non-light emit regions of the light guide module) of the polarizers, greatly improving the transmittance rate and the utilization rate of the light, and the diffracted light emitted toward the polarizers is absorbed because it is perpendicularly to the polarization direction of the polarizers.

For example, in at least one embodiment of the present disclosure, the light direction control section further comprises a quarter-wave plate located between the polarizing layer and the reflective layer. In this way, it is not need to make the product of the thickness and the optical anisotropy of the liquid crystal layer be about one fourth of the wavelength of the light emitted from the light guide module, so the thickness design, material selection, and the like of the liquid crystal layer are not limited in this condition. For example, the quarter-wave plate may be disposed between the liquid crystal layer and the polarizers, or may be disposed between the reflective layer and the liquid crystal layer. The structure of the light direction control section having the quarter-wave plate can be referred to the related content in the embodiments shown in FIG. 8B described below, and details are not described herein.

For example, in at least one embodiment of the present disclosure, a plurality of the first regions and a plurality of the second regions are defined on the first major surface, and the plurality of first regions and the plurality of second regions are arranged in an array and disposed at intervals. Exemplarily, as shown in FIG. 2A, a plurality of the first regions 211 and a plurality of the second regions 212 are defined on the first major surface 21, and the plurality of first regions 211 and the plurality of second regions 212 are arranged in an array and disposed at intervals. In this way, the light emitted from the light guide module is more evenly distributed, and the display effect of the display device is further improved.

In at least one embodiment of the present disclosure, the shapes of the plurality of first regions 211 and the plurality of second regions 212 are not particularly limited, and those skilled in the art can select flexibly according to actual needs. For example, in at least one embodiment of the present disclosure, the shapes of the plurality of first regions 211 and the plurality of second regions 212 comprise, but are not limited to, regular or irregular geometric shapes such as rectangles, squares, and the like.

For example, in at least one embodiment of the present disclosure, the polarizers are disposed in a one-to-one correspondence with the first regions, and the first region coincides with an orthogonal projection of the corresponding polarizer on the first major surface or the first region is located in an orthogonal projection of the corresponding polarizer on the first major surface. Exemplarily, as shown in FIG. 2A, the first region 211 is located within the orthogonal projection of the corresponding polarizer 71 on the first major surface 21. In this way, the light emitted from the first regions of the light guide module passes through the polarizers to become polarized light, so the light that is reflected by the reflective layer and directed to the polarizers is able to be completely absorbed by the polarizers, and the contrast of the display device is improved.

Figure 2B:
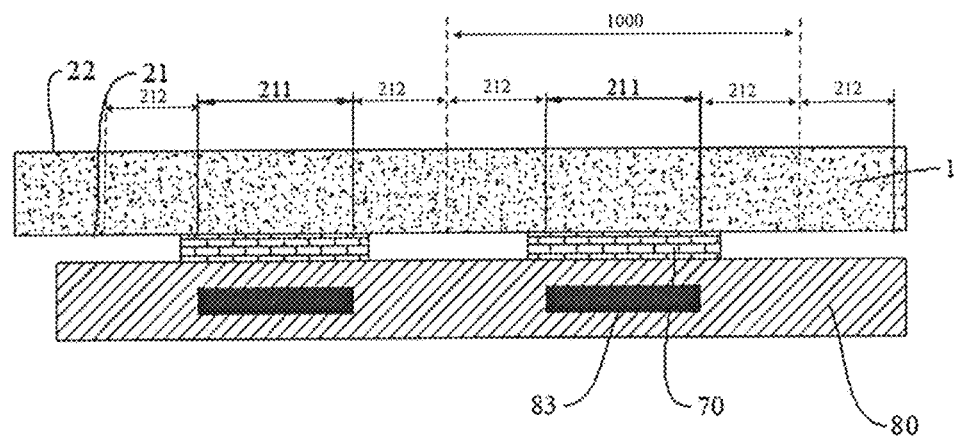
FIG. 2B is a schematic structural diagram of a display device according to an embodiment of the present disclosure.

In at least one embodiment of the present disclosure, the display device comprises a plurality of pixel regions. For example, in some embodiments, as shown in FIG. 2A, each one of the pixel regions 1000 comprises one non-display area corresponding to one first region 211 and one display area corresponding to two second regions 212, and in each one of the pixel regions 1000, the display area (an area of the display corresponding to the second region 212 as shown in FIG. 2A) is located at one side of the non-display area (an area of the display corresponding to the first region 211 as shown in FIG. 2A). For example, in some other embodiments, as shown in FIG. 2B, each one of the pixel regions 1000 comprises one non-display area corresponding to one of the first regions 211 and two display areas corresponding to two of the second regions 212, and in each one of the pixel regions, the non-display area (an area of the display corresponding to the first region 211 as shown in FIG. 2B) is located between two display areas (areas of the display corresponding to the second region 212 as shown in FIG. 2B). In the case where the non-display area in each pixel region is located between two of the display areas, while preventing the interference between adjacent pixel regions, and each of the pixel regions can have a large aperture ratio (in each one of the pixel regions, the area ratio of display areas to pixel regions).

In at least one embodiment of the present disclosure, the material for forming the polarizer is not particularly limited and can be selected by the skilled in the art as needed. For example, in at least one embodiment of the present disclosure, the material for forming the polarizers comprise dichroic dyes. In this way, the utilization rate and the transmittance rate of the light are able to be further improved.

Figure 3:
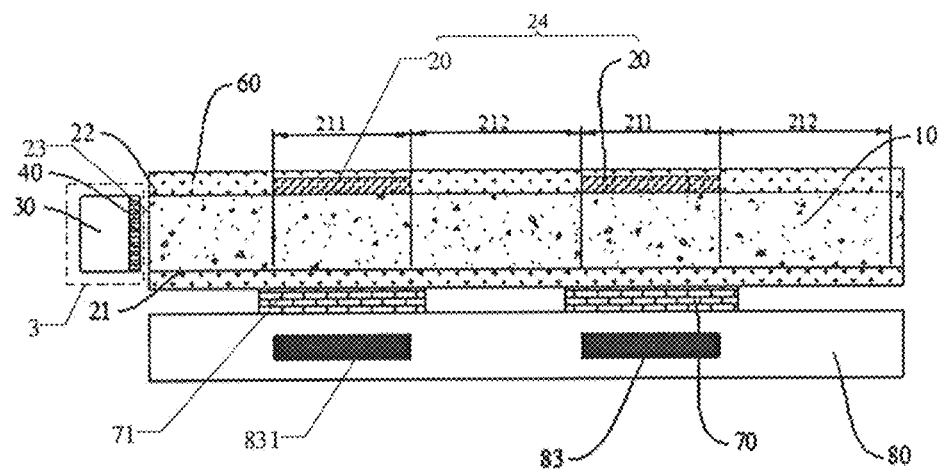
FIG. 3 is a schematic structural diagram of a display device according to another embodiment of the present disclosure.

FIG. 3 is a schematic structural diagram of a display device according to an embodiment of the present disclosure.

For example, in at least one embodiment of the present disclosure, the light guide module further comprises a light guide plate, a light supply section and a light extraction layer, and the light guide plate comprises two opposite major surfaces and a first side surface located between the two major surfaces, and the two main surfaces are the first major surface and the second major surface respectively, and the light supply section is disposed opposite to the first side surface to transmit light into the light guide plate, and the light extraction layer is located on the first major surface or the second major surface and configured to derive the light emitted from the light supply section out of the light guide plate.

Exemplarily, as shown in FIG. 3, the light guide module 1 comprises a light guide plate 10, a light supply section 3 (a structure in a dashed line frame in FIG. 3) and a light extraction layer 24, the first major surface 21 and the second major surface 22 are respectively two major surfaces of the light guide plate 10, the first side surface 23 is located between the first major surface 21 and the second major surface 22, and the light emitted from the light supply section 3 is injected into the light guide plate 10 through the first side surface 23, the light extraction layer 24 is able to export the light in the light guide plate 10. In this way, the light guide module 1 is able to provide light for displaying images.

For example, in at least one embodiment of the present disclosure, the light extraction layer comprises a plurality of light extraction units disposed at intervals, and orthographic projections of the light extraction units on the first major surface coincide with the first regions. Exemplarily, as shown in FIG. 3, the light extraction layer 24 comprises a plurality of light extraction units 20 disposed at intervals, and orthographic projections of the light extraction units 20 on the first major surface 21 coincide with the first regions 211. In this way, the position of the first regions 211 can be defined by the light extraction units 20.

In at least one embodiment of the present disclosure, the type of the light extraction layer is not limited. For example, the light extraction layer may be a light extraction grating. For example, the light extraction grating is a transmission grating and the transmission grating is located on the first major surface. For example, the light extraction grating is a reflection grating and the reflection grating is located on the second major surface. Exemplarily, as shown in FIG. 3, the light extraction layer 24 (the light extraction units 20) may be a light extraction grating, and the light extraction grating is disposed on the first major surface 21 (not shown in the figure, the light extraction grating is a transmission grating) or the second major surface 22 (the light extraction grating is a reflective grating), for forming the first regions 211. In this way, the propagation direction of the light emitted from the light guide plate 10 is able to be controlled, for example, the light can be taken out at a collimated angle with respect to the first major surface 21, and a collimated light source of high-transmittance is able to be realized, so the light can be emitted vertically from the light guide module, thereby improving the utilization rate and the transmittance rate of the light.

In at least one embodiment of the present disclosure, the direction of the light extracted by the light extraction layer is not limited, as long as the light extracted is directed to the polarizer 71. For example, the light extraction layer is configured to make the direction of the light extracted from the light guide plate be perpendicular to the first major surface.

In the following, the technical solutions in at least one embodiment of the disclosure are described below by taking the propagation direction of the light from the light extraction layer being perpendicular to the first major surface of the light guide module as an example.

In at least one embodiment of the present disclosure, the incident light is totally reflected in the area where the light grating is not disposed, the light is taken out when the incident light is acted by the light extraction grating, the technical effect of obtaining the collimated light is able to be achieved by designing the parameters of the light extraction grating such as grating period P, number of steps, grating width D, height H, refractive index, and the like.

In at least one embodiment of the present disclosure, there are no restrictions on the grating period P, the number of steps, the height h, and the refractive index of the light extraction grating, as long as the above parameters are designed to take the light out vertically when the incident light reaches the light extraction grating. In at least one embodiment of the present disclosure, the grating period P is 0.05-5 microns, the grating width D is 0.5-5 microns, and the duty cycle D/P is 0.5-1. In this way, a better technical effect of extracting the collimated light is able to be achieved, for example, increasing the degree of collimation of the extracted light.

In at least one embodiment of the present disclosure, in order to extract the light incident on the light extraction grating at a collimation angle, the light extraction grating may be an echelon grating, a simple grating or a hole grating. For example, the light extraction grating is an echelon grating, and the technical effect of removing the collimated light is able to be further improved.

Figure 6:
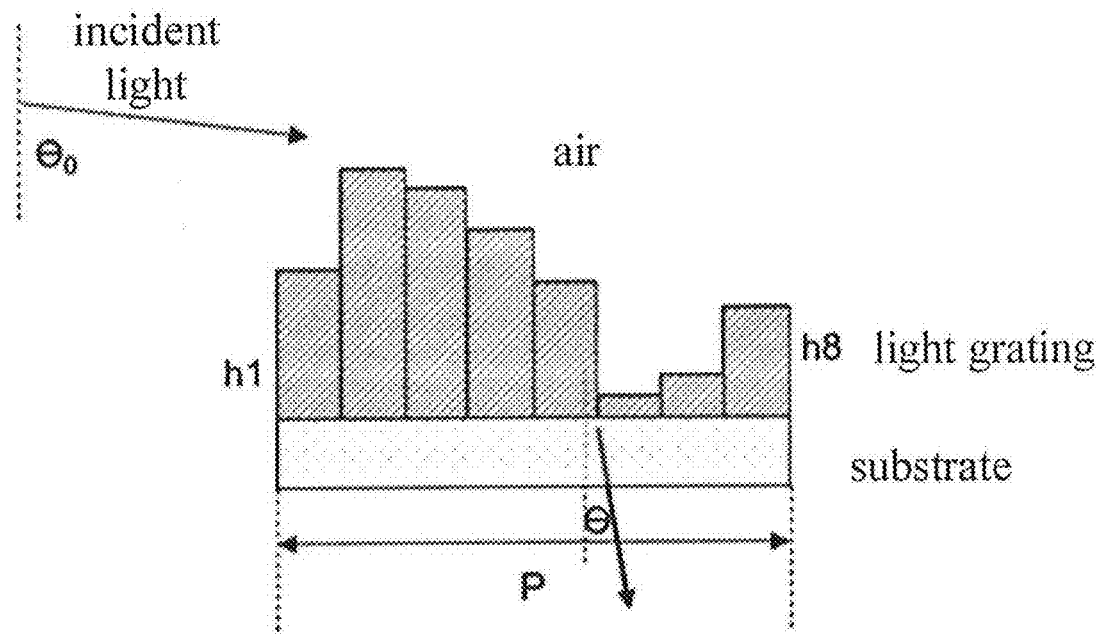
FIG. 6 is a schematic structural diagram of an echelon grating according to another embodiment of the present disclosure.

FIG. 6 is a schematic structural diagram of an echelon grating according to an embodiment of the present disclosure.

Exemplarily, as shown in FIG. 6, the light extraction grating is an eight-order echelon grating with a duty ratio of 1, it is that the width of each grating is D/8, and the height of each step is H1-H8, the parameters are shown in table 1 below, the height of the eight-order grating is shown in table 2 below.

TABLE 1

| Incident angle $\theta_0$ | Grating refractive index | Substrate refractive index | Grating period/ microns | Number of steps | Refractive index of incident medium | Transmittance rate | Refractive rate | Exit angle | Output ratio at exit angle $\theta$ |
|---|---|---|---|---|---|---|---|---|---|
| 85° | 1.8 | 1.5 | 1.8 | 8 | 1.0 | 58% | 42% | 0.14° | 90% |

TABLE 2

| Steps | Grating Height/microns |
|---|---|
| H1 | 1.21 |
| H2 | 1.94 |
| H3 | 1.71 |
| H4 | 1.45 |
| H5 | 1.18 |
| H6 | 0.19 |
| H7 | 0.32 |
| H8 | 0.99 |

Figure 7:
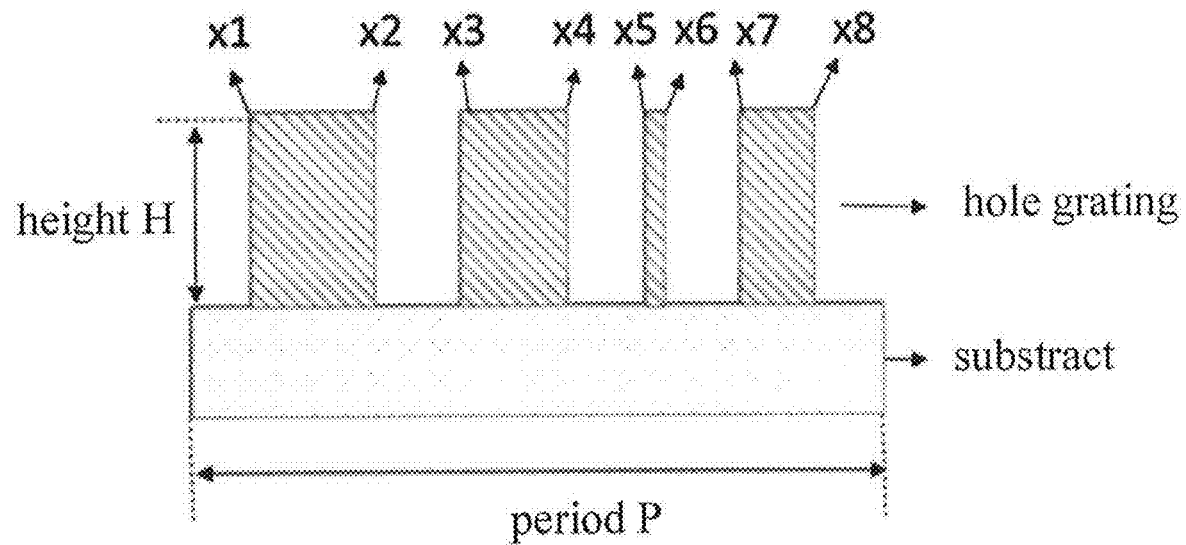
FIG. 7 is a schematic structural diagram of a hole grating according to another embodiment of the present disclosure.

For example, in at least one embodiment of the present disclosure, as shown in FIG. 7, the light extraction grating is a hole grating, and the shape of the hole may be a circular hole or a square hole, and the height H of the grating is the same and the range is able to be 0-10 micron, and there are 5 holes in a grating period, and according to the position of node to define the structure of the grating hole, there are 8 nodes in FIG. 7, and the location of the nodes are shown in table 3 below, and the parameters of the hole grating are shown in table 4 below.

TABLE 3

| Node | Node size/microns |
|---|---|
| X1 | 0.21 |
| X2 | 0.25 |

TABLE 3-continued

| Node | Node size/microns |
|---|---|
| X3 | 0.27 |
| X4 | 0.39 |
| X5 | 0.68 |
| X6 | 0.7 |
| X7 | 0.77 |
| X8 | 0.9 |

TABLE 4

| Incident angle $\theta_0$ | Grating refractive index | Substrate refractive index | Grating period/ microns | Number of steps | Refractive index of incident medium | Transmittance rate | Refractive rate | Exit angle | Output ratio at exit angle $\theta$ |
|---|---|---|---|---|---|---|---|---|---|
| 70°-90° | 1.8 | 1.5 | 0.9 | 8 | 1.0 | 37% | 63% | 0.15° | 73% |

It should be noted that FIG. 6 and FIG. 7 merely illustrate the structure of the light extraction grating in at least one embodiment of the present disclosure, and it should not be construed as a limitation of the present disclosure. As long as not depart from the inventive concept of the present disclosure, reasonable substitutions and changes made to the present disclosure are all within the protection scope of the present disclosure without creative work.

In at least one embodiment of the present disclosure, the light emitted from the light extraction grating may be polarized light or non-polarized light, and the skilled in the art can flexibly select the type of the emitted light according to actual conditions. For example, in at least one embodiment of the present disclosure, the grating period P of the light extraction grating is close to or less than the wavelength of the incident light. In this situation, the light emitted from the light extraction grating is polarized light, and the polarization direction of the polarized light is the same as the polarization direction of the polarizers, thus the polarized light has a first polarization direction. In this way, the polarized light emitted from the light guide module is transmitted out, and other disturbing light (such as ambient light) is absorbed, which is favorable for improving the display effect.

Figure 9:
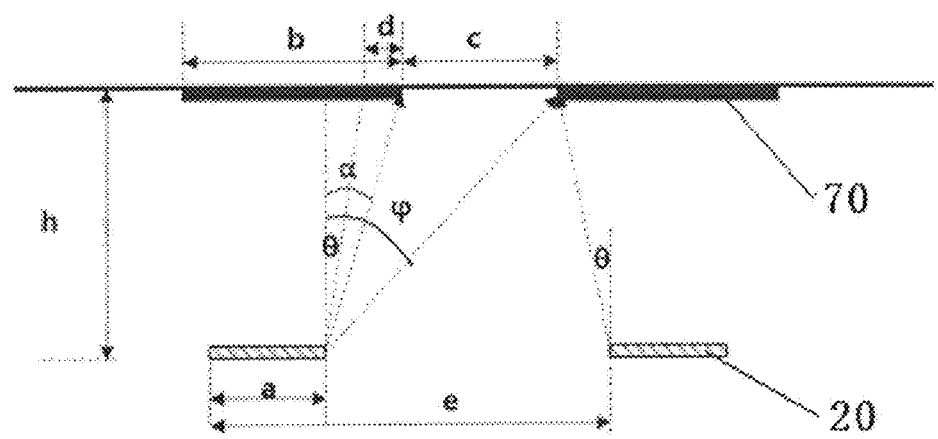
FIG. 9 is a schematic diagram showing width relationship between the light extraction grating and the polarizer according to further another embodiment of the present disclosure.

In at least one embodiment of the present disclosure, the width of the light extraction grating and the width of the polarizer is able to be controlled, thereby further improving the display effect of the display device. Exemplarily, the width relationship between the light extraction grating (light extraction units 20) and the polarizers 71 is able to be referred to FIG. 9, in which α is a shading angle in the drawing, θ is a collimation angle (light angle/exit angle), and φ is a transmission angle. Further, a represents the width of the light extraction grating, e represents a light extraction units, b represents the width of the polarizing layer, c represents the width of a transmission region, d represents a process deviation, and h represents the distance between the light extraction grating and the polarization layer.

Based on the geometric relationship:

$$b = a + (h * \tan\theta + d) * 2$$

the light shielding region width b and the shading angle α are able to be obtained according to the grating width a, the light angle θ, the distance h between the light extraction grating and the polarizing layer, and the value of the process deviation d. According to the above formula, the smaller h is, the smaller b is, therefore, in the case where the light extraction grating (light extraction units 20) is located on the light emit surface of the light guide plate, given other parameters the value of b is the smallest, that is, the transmittance rate of the light is the highest. For example, in at least one embodiment of the present disclosure, the light extraction grating is able to be disposed on the first major surface to further reduce the value of h, thereby increasing the transmittance rate of the light, and accordingly, the light extraction grating is a transmission grating. For example, in at least one embodiment of the present disclosure, the grating width a is 10 μm, the light exit angle is ±5°, the height is 160 μm, the process deviation d is 5 μm, and b is 48 μm, c can be calculated if e is also known, thereby the aperture ratio c/e of pixel regions is able to be obtained. Exemplarily, in the case where each of pixel regions comprises one non-display area corresponding to one first region 211 and one display area corresponding to two second regions 212, the aperture ratio of the pixel regions is c/e.

For example, in at least one embodiment of the present disclosure, the light supply section further comprises a side entry light source and a coupling grating, and the coupling grating is configured to adjust the propagation direction of the light emitted from the side entry light source to make the light emitted from the side entry light source be totally reflected within the light guide plate. Exemplarily, as shown in FIG. 3, a coupling grating 40 is disposed between the side entry light source 30 and the light guide plate 10. Thus, after the propagation direction of the light emitted from the side entry light source 30 is adjusted (for example, reflected or diffracted) by the coupling grating 10, and the light is emitted at a relatively large range of angles into the light guide plate 10, so the incident angle of the light is greater than the critical angle $\theta_i$ of the light totally reflected in the light guide plate, that is, it is required that the light transmitted into the light guide plate 10 is at least able to be totally reflected and propagated forward in the light guide plate 10, and the utilization rate of light can be improved.

In at least one embodiment of the present disclosure, there is no limitation on the selection of the side entry light source, and the skilled in the art can flexibly select according to actual conditions. For example, in at least one embodiment of the present disclosure, the side entry light source may be a light bar. For example, the light bar may be a monochromatic light source, for example further a lambert light source such as an LED or Micro LED light source. In this way, the radiance brightness of the light emitted from the side entry light source does not change with the change of direction, and the utilization rate and the transmittance rate of light are able to be improved. In addition, in at least one embodiment of the present disclosure, the refractive index of the light bar is able to be smaller than the refractive index of the light guide plate, thereby the light of a large divergence angle emitted by the side-entrance light source can be converged to a smaller divergence angle light and then enter the light guide, and the utilization rate and the transmittance rate of light are able to be further improved.

For example, in at least one embodiment of the present disclosure, the light guide module further comprises at least one total reflective layer, which is located on the first major surface and/or the second major surface. Exemplarily, as shown in FIG. 3, the total reflective layers 60 are disposed on the first major surface 21 and the second major surface 22. There is no limitation on the material for forming the total reflective layers as long as total reflection can be realized in the light guide plate, for example, in at least one embodiment of the present disclosure, the refractive index of the total reflective layer is smaller than the refractive index of the light guide plate itself. In this way, light is not emitted out from the light guide plate, thereby increasing the utilization rate and the transmittance rate of the light. For example, the total reflective layer is able to be configured to cover the light extraction layer (a light extraction grating) so as to planarize the surface of the light guide plate, thereby facilitating manufacturing of other components (for example, the polarizers, etc.) on the light guide plate, and simplifying the manufacturing process of the display device.

Figure 5:
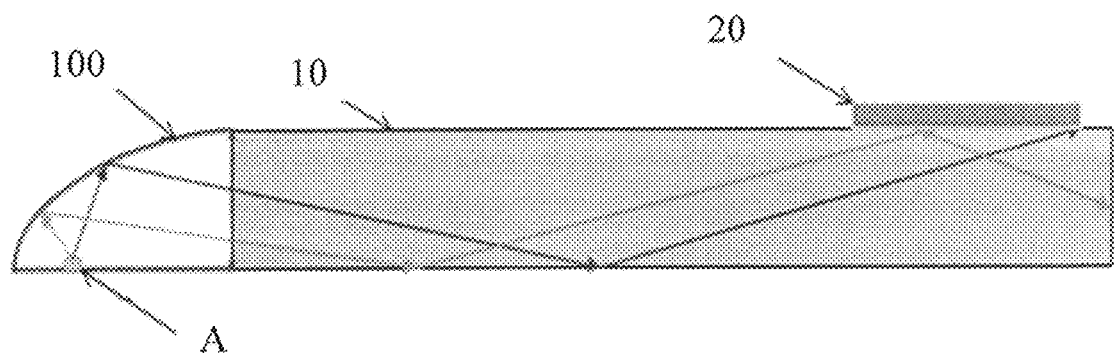
FIG. 5 is a schematic structural diagram of a display device according to another embodiment of the present disclosure.

For example, in at least one embodiment of the present disclosure, the coupling grating comprises a curved reflective mirror, and the shape of the sectional view of the curved reflective mirror in the direction perpendicular to the first major surface is a part of a parabola, and the side entry light source is located at the focus of the parabola. Exemplarily, as shown in FIG. 5, the coupling grating in the light guide module may be a parabolic reflective mirror 100, and the side entry light source is located at the focus A of the parabolic reflective mirror 100. Thus, the parabolic reflective mirror is able to reflect light of all directions into the light guide plate, thereby increasing the utilization rate of light, and increasing the transmittance rate of the light. For example, the direction of the light reflected by the parabolic reflective mirror is substantially the same when the reflected light enters the light guide plate, so the collimation degree of the light derived from the light extraction grating is able to be further improved. For example, a grating may be further placed on the parabolic reflective mirror to further adjust the propagation direction of the light reflected by the parabolic reflective mirror.

In at least one embodiment of the present disclosure, a metal layer (not shown in the drawings) is able to be coated on a side of the parabolic reflector away from the light guide plate, and the utilization rate of the light is able to be further improved. In this way, the metal layer is able to reflect a portion of the light to the light guide plate, and the utilization rate of the light is improved.

In at least one embodiment of the present disclosure, there is no limitation on the type of the metal layer, and those skilled in the related art can flexibly select a suitable material according to actual conditions. For example, in at least one embodiment of the present disclosure, the type of metal layer is a metal such as aluminum, silver or the like, or a metal alloy.

Figure 4:
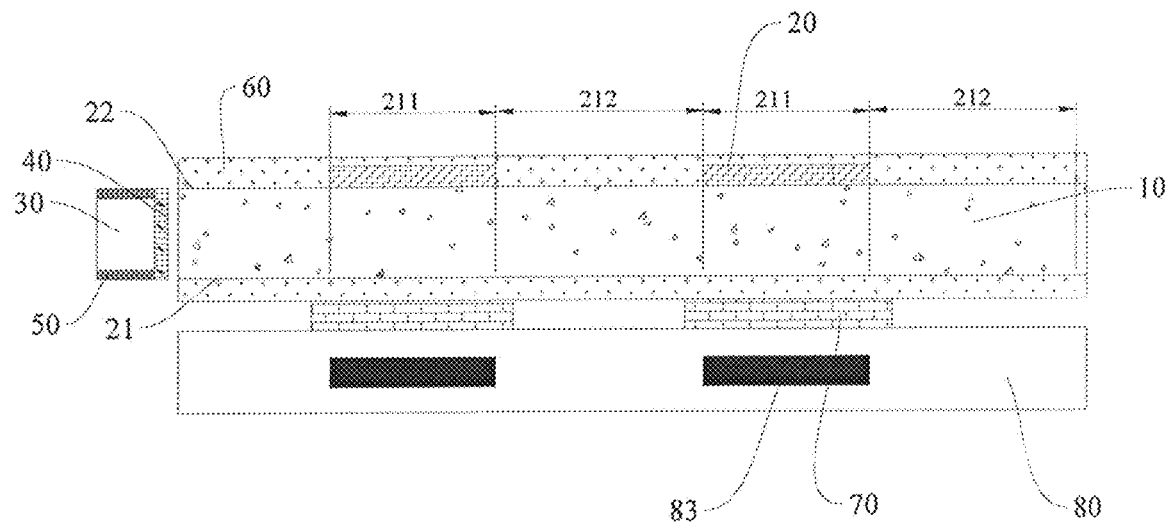
FIG. 4 is a schematic structural diagram of a display device according to another embodiment of the present disclosure.

For example, in at least one embodiment of the present disclosure, as shown in FIG. 4, the light guide module is able to further comprise a reflective sheet 50 disposed on each side of the side entry light source. Thus, the reflective sheet 50 is able to reflect the light in other directions into the light guide plate again, further increasing the utilization rate of the light.

For example, in at least one embodiment of the present disclosure, there is no limitation on the materials for forming the reflective sheet 50 and the parabolic reflective mirror 100. For example, in at least one embodiment of the present disclosure, the materials for forming the reflective sheet 50 and the parabolic reflective mirror 100 are able to be a material having a reflective function such as a metal, a metal alloy or the like. For example, in at least one embodiment of the present disclosure, in the case where the parabolic reflective mirror has a reflective structure such as a metal layer on a side away from the light guide plate, the material of the parabolic reflective mirror is able to have a reflective function, and is also able to be a transparent or translucent material such as polymethyl methacrylate (PMMA), polyethylene terephthalate (PET), or the like.

For example, in at least one embodiment of the present disclosure, the reflective layer comprises a plurality of reflective units disposed at intervals, and the reflective units are in one-to-one correspondence with the polarizers. Exemplarily, as shown in FIG. 3, the reflective layer 83 comprises a plurality of spaced reflective units 831. In this configuration, the light from the back side of the display device is able to pass through the display device through the gaps between the plurality of reflective units 831, thereby achieving the function of transparent display.

For example, in at least one embodiment of the present disclosure, the reflective layer is able to be configured as a reflective electrode and the reflective units are sub-reflective electrodes. For example, each of the sub-reflective electrodes is able to be a pixel electrode or a common electrode.

In the following, taking the reflective layer as a reflection electrode as an example, the following technical solutions in at least one embodiment of the present disclosure will be described.

In at least one embodiment of the present disclosure, there is no limitation on the material of the reflective electrode, and those skilled in the related art can flexibly select according to actual conditions. In some embodiments of the present disclosure, the material of the reflective electrode may be aluminum, silver, metal alloy, or the like. In this way, the electrical performance is good, the reflectance rate to light is high, and the reflective display quality is improved.

For example, in at least one embodiment of the present disclosure, an orthographic projection of one reflective unit on the first major surface coincides with an orthographic projection of one corresponding polarizer on the first major surface; or an orthographic projection of the reflective unit on the first major surface is located within an orthographic projection of the corresponding polarizer on the first major surface. In this way, in the case where the display device is in a black state display, the light reflected by the reflective layer is able to be prevented from exiting from the gaps between the polarizers, thereby improving the contrast of displayed images. In order to achieve a better display effect, the projection of each polarizer on the first major surface covers the projection of at least one first region and at least one sub-reflective electrode on the first major surface. For example, the projection of each polarizer on the first major surface covers the projection of one first region and one sub-reflective electrode on the first major surface, and the number of polarizers, the number of first regions, and the number of sub-reflective electrodes are the same. In this way, it can be ensured that the light is absorbed during the black state display, the contrast of the display device is high, and the display effect is improved.

In at least one embodiment of the present disclosure, referring to FIG. 8A and FIG. 8B, the light direction portion 80 comprises an alignment layer 81 disposed on a side of the polarizing layer 70 away from the light guide plate 10; a liquid crystal layer 82 disposed on a side of the alignment layer 81 away from the light guide plate 10; a first planarization layer 84 disposed on a side of the liquid crystal layer 82 away from the light guide plate 10; a second planarization layer 86 disposed on a side of the first planarization layer 84 away from the light guide plate 10; a first electrode 85 embedded in a side of the second planarization layer 86 away from the light guide plate 10; an insulating layer 87 disposed on a side of the first electrode 85 away from the light guide plate 10; and a second electrode 88 disposed on a side of the insulating layer 87 away from the light guide plate 10; the reflective electrode 83 is disposed between the liquid crystal layer 82 and the first planarization layer 84. The liquid crystal control electrode may comprise the first electrode 85 and the second electrode 88. In this way, the display device of a reflective display mode is realized, and the transmittance rate and the utilization rate of the light are high.

Exemplarily, a quarter-wave plate may be not provided in the display device of this embodiment. As shown in FIG. 8A, in a direction perpendicular to the first major surface 21, the product of a thickness and an optical anisotropy of the liquid crystal layer 82 is about one fourth of a wavelength of the light emitted from the light guide module. Exemplarily, on the other hand, a quarter-wave plate is able to be disposed in the display device, and as shown in FIG. 8B, the quarter-wave plate 91 is located between the reflective layer 83 and the polarizing layer 70. For example, as shown in FIG. 8B, the quarter-wave plate 91 is located on the first planarization layer 84.

In at least one embodiment of the present disclosure, the display device further comprises a base substrate 90 disposed on a side of the light direction control section 80 away from the light guide plate 10. In this way, the display device is able to be supported and protected by the base substrate 90.

At least one embodiment of the present disclosure provides a display method of the above-described display device, the display method comprising: in a first display state, the light having the first polarization direction emitted by the first regions of the light guide module and transmitted through the polarizer being reflected by the reflective layer after passing through the light direction control section, and the light reflected by the reflective layer having the second polarization direction after passing through the light direction control section and being directed toward the polarizer; and in a second display state, controlling the light direction control section to change the propagation direction of the light emitted from the first regions of the light guide module and transmitted through the polarizer, and the light direction control section making at least part of the light reflected by the reflective layer be directed to the second regions. In the above display method, in the process that the light emitted from the light guide module is transmitted to the reflective layer and is reflected by the reflective layer and then is directed to the light guide module, the light direction control section is able to control the propagation direction of the light and make the light reflected by the reflective layer be directed to the first regions or the second regions, so as to switch between the first display state (black state display) and the second display state (non-black state display), and in the second display state, the passing amount of the light in the second regions is adjusted, and the control of the display gray scale of the display device is realized. In the display device, the light emitted from the second regions need not pass through the polarizers twice, increasing the transmittance rate of the light, thereby improving brightness of the display images.

Exemplarily, the process of the display method is able to comprise: using a light guide module to convert the light from a light source (for example, a light supply section in a light guide module) into collimated light distributed at intervals; the collimated light is sequentially passed through the polarizers and the liquid crystal grating in the light direction control section; the light passing through the liquid crystal grating passes being reflected by the reflective electrode and passing through the liquid crystal grating and the polarizing layer again, with part of the light passing through the space (corresponding to the second regions of the light guide module) between the polarizers of the polarizing layer so as to display images. In this way, by controlling the voltage (in turn controlling the electric field generated by the liquid crystal control electrode) applied to the liquid crystal grating, the liquid crystal grating is able to have different diffraction efficiencies, thereby achieving gray scale display, and the transmittance rate and the utilization rate of the light is able to be effectively improved because the light needs not pass through the polarizers twice.

It should be noted that the display device for implementing the display method is anyone of the display devices described above, the structure and parameters of the display device are the same as anyone of the display devices described above, and details are not described herein.

Figure 10:
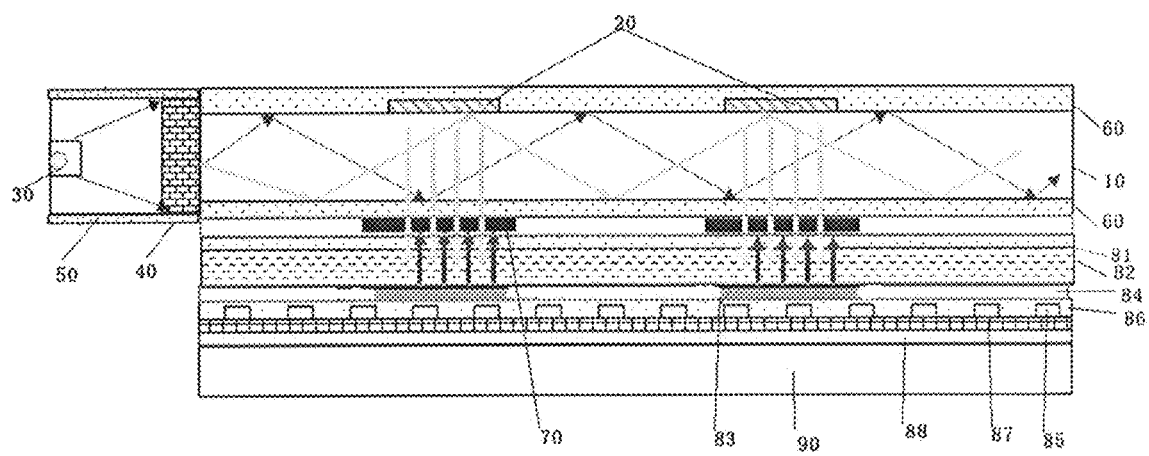
FIG. 10 is a schematic structural diagram of a display device in a black state according to further another embodiment of the present disclosure.

For example, in a display method of a display device according to at least one embodiment of the present disclosure, as shown in FIG. 10, in the case where the display device is in black state display, the light emitted from the plurality of light extraction gratings 20 on the light guide plate 10 is collimated polarized light. A plurality of polarizers 71 are disposed at intervals on the side of the light guide plate 10 away from the light extraction grating (light extraction unit 20). The transmission axes of the plurality of polarizers 71 is the same as the polarization direction of the emitted light and therefore both have the first polarization direction. Thus, the polarized light emitted from the light guide plate 10 is transmitted through the polarizers 71, and other unwanted light (such as ambient light) is absorbed, and the polarized light transmitted through the plurality of polarizers 71 is incident on the liquid crystal layer 82, which satisfies the condition of "$\Delta n \times d = \lambda/4$", where $\Delta n$ is the optical anisotropy of light, d is the thickness of the liquid crystal layer in the direction perpendicular to the first major surface, and $\lambda$ is the wavelength of light emitted from the light supply section in the light guide module. For example, the vibration direction (first polarization direction) of the polarized light incident on the liquid crystal layer 82 is parallel to the paper surface in the drawings, the polarized light passes through the liquid crystal layer 82 and becomes right-handed polarized light, and is reflected by the plurality of sub-reflecting electrodes (reflective units 831) and accordingly becomes left-handed polarized light, and the left-handed polarized light is modulated by the liquid crystal layer 82 into polarized light (having the second polarization direction) whose vibration direction is perpendicular to the paper surface in the drawings, the polarized light is absorbed by the polarizers after reaching the polarizers, it is that the light for displaying is not emitted out, and the black state display is appeared.

Figure 11:
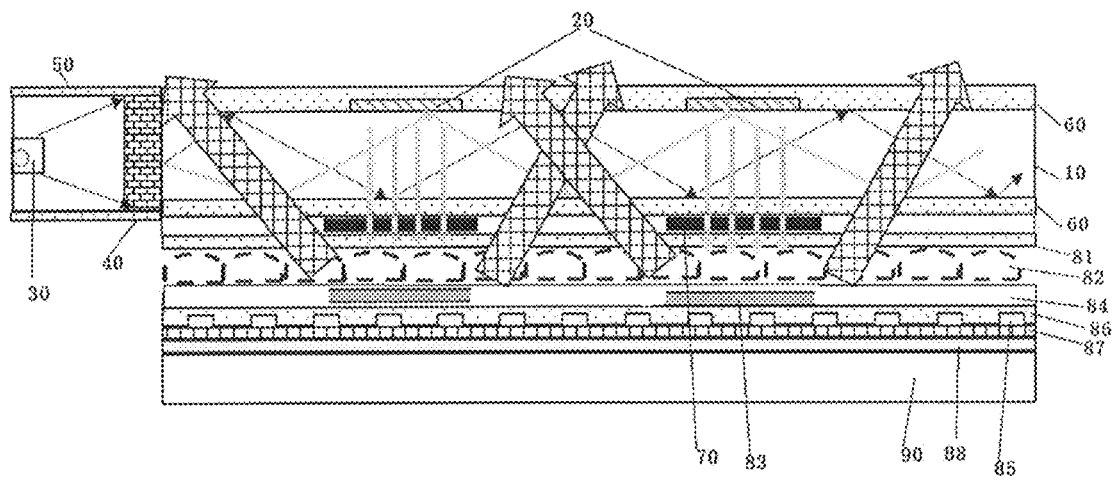
FIG. 11 is a schematic structural diagram of a display device in a gray display state according to further another embodiment of the present disclosure.

For example, in a display method of the display device provided by at least one embodiment of the present disclosure, as shown in FIG. 11, when the display device is in a non-black state display, a certain voltage signal is applied to the liquid crystal layer 82, thereby the liquid crystal layer acts as a periodically arranged liquid crystal grating, pattern display is realized by using diffraction of the liquid crystal gratings. For example, the collimated polarized light emitted from the light guide plate 10 is reflected by a plurality of sub-reflective electrodes (reflective units 831), and then diffracted by the liquid crystal gratings, and then emitted from the opening regions between the plurality of polarizers 71 (corresponding to the non-light emit regions of the light guide module), and by controlling the electronic signal applied to the liquid crystal layer 82, the difference in the diffraction efficiency of the incident light by the liquid crystal layer 82 can be achieved, thereby achieving a non-black state display in which the gray scale is adjusted between L1 and L255.

Exemplarily, in the case where the period of the liquid crystal grating formed by the liquid crystal layer 82 is fixed, as voltage applied on the liquid crystal control electrode increases, the diffraction efficiency of the liquid crystal grating increases, and accordingly, the amount of the light diffracted by the liquid crystal grating and directed to the second regions of the light guide module increases, that is, the passing amount of the light in the second regions increases. In this way, as the voltage applied on the liquid crystal control electrode increases, the display gray scale of the second area increases, that is, the display gray scale of the second area is able to increase from L1 to L255, thereby achieving brightness adjustment of the second regions. It should be noted that in at least one embodiment of the present disclosure, the display gray scale of the display device is not limited to 256 levels including L0-L255, which can be designed according to actual needs.

For example, in the case where a plurality of polarizers, a plurality of reflective electrodes and a plurality of light extraction gratings are disposed in a one-to-one correspondence relationship, the background light is able to freely pass through the opening regions between the polarizers and the opening regions between the sub-reflective electrodes, and achieving the function of transparent display on the basis of the increased transmittance rate of the display device.

In at least one embodiment of the present disclosure, in a process that the display device displaying images, the structure of the display device is explained in detail according to an analysis of an propagation path of light, wherein the participation of the background light is not considered, and a product of a thickness and an optical anisotropy of the liquid crystal layer is about one fourth of a wavelength of the light emitted from the light guide module.

Exemplarily, in the light guide module, the light is emitted from the light supply portion and the light is injected into the light guide plate at a wide range of angles, so the light is totally reflected in the light guide plate; then, part of the light in the light guide plate emits from the first regions of the first major surface under the action of the light extraction grating, and the propagation direction of the light emitted from the first regions is perpendicular to the first major surface; and the light emitted from the first regions in the light guide plate becomes linearly polarized light having first polarization direction after passing through polarizers of the polarization layer, then, the linearly polarized light enters the light direction control section (the liquid crystal layer is formed as a liquid crystal grating); and at least part of the linearly polarized light is diffracted by the liquid crystal grating, thereby the propagation direction of the part of the linearly polarized light is changed, and the linearly polarized light becomes circularly polarized light such as right-handed polarized light after passing through the liquid crystal grating; and the right-handed polarized light becomes left-handed polarized light after being reflected by the reflective layer; and the left-handed polarized light enters the light direction control section; and the liquid crystal grating diffracts at least part of the left-handed polarized light to change the propagation direction of the at least part of the left-handed polarized light, and the left-handed polarized light becomes linearly polarized light having a second polarization direction after passing through the liquid crystal grating, and the second polarization direction perpendicular to the first polarization direction. In the above process, under diffracting effect of the liquid crystal grating, the propagation direction of at least part of the light is not perpendicular to the first major surface, therefore, the light reflected by the reflective layer is not all directed to the polarizers, and some of the light passes through the spaces of the polarizers and enter the light guide plate from the second regions. Light that enters the light guide plate from the second region emits from the second major surface of the light guide plate, thereby displaying images.

In at least one embodiment of the present disclosure, in the case where the liquid crystal layer in the display device forms a liquid crystal grating, parameters such as period of the liquid crystal grating, diffraction angle, and the like are not limited, as long as the cooperation of the liquid crystal grating and the reflective layer allows light (the light comes from the light supply section of the light guide module) to be emitted from the second regions. For example, diffraction angle of the liquid crystal grating is able to be 10 degrees-45 degrees, for example, further 20 degrees, 30 degrees, 41 degrees, or the like; the period of the liquid crystal grating is able to be 100 nanometers to 10 micrometers, for example, further 450 nanometers, 620 nanometers, 2.5 micrometers, or the like. For example, in the case where the liquid crystal grating has the above parameters, for the light diffracted by the light direction control section after reflected by the reflective layer, angles between the propagation direction of most of the light and a normal line of the second major surface are able to be 0 degree-60 degrees, for example, further 10 degrees-50 degrees. For example, a structure such as quantum dots are able to be provided at a position of the display device corresponding to the second regions, the structure is able to increase scattering degree of the light, thereby increasing viewing angles of the display images of the display device.

Figure 12:
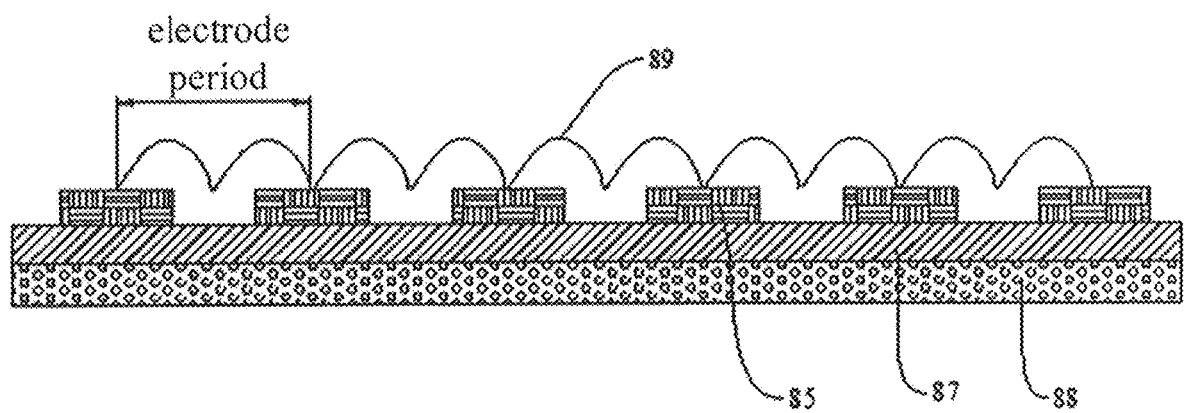
FIG. 12 is a schematic structural diagram of a shape of the liquid crystal grating according to further another embodiment of the present disclosure.

For example, in the display method of the display device according to at least one embodiment of the present disclosure, in the process of implementing the gray scale display, the number of the first electrodes in the liquid crystal control electrode for forming the liquid crystal grating is not limited, those skilled in the related art can flexibly select the number according to the gray scale status intended to achieve. For example, in some embodiments of the present disclosure, as shown in FIG. 12, the liquid crystal control electrode is able to be configured as a planar electric field electrode (ADS electrode) structure, and two liquid crystal grating cells 89 are formed in one electrode period, and thus the liquid crystal grating cells 89 is formed relatively small, and the diffraction efficiency is increased. For example, in some other embodiments of the present disclosure, a liquid crystal grating cell is also able to be formed by a plurality of electrodes of the liquid crystal control electrode, and thus, the smaller the grating period (the electrode period), the bigger the diffraction ability and the higher transmittance rate of the light.

It should be noted that the electrode period refers to the width of one electrode plus the width of a gap between adjacent electrodes, as shown in FIG. 12. Those skilled in the related art can understand that the liquid crystal grating cell 89 in FIG. 12 does not show the true morphology of the liquid crystal grating cell but a schematic diagram of the liquid crystal grating equivalent to grating shape.

Figure 13:
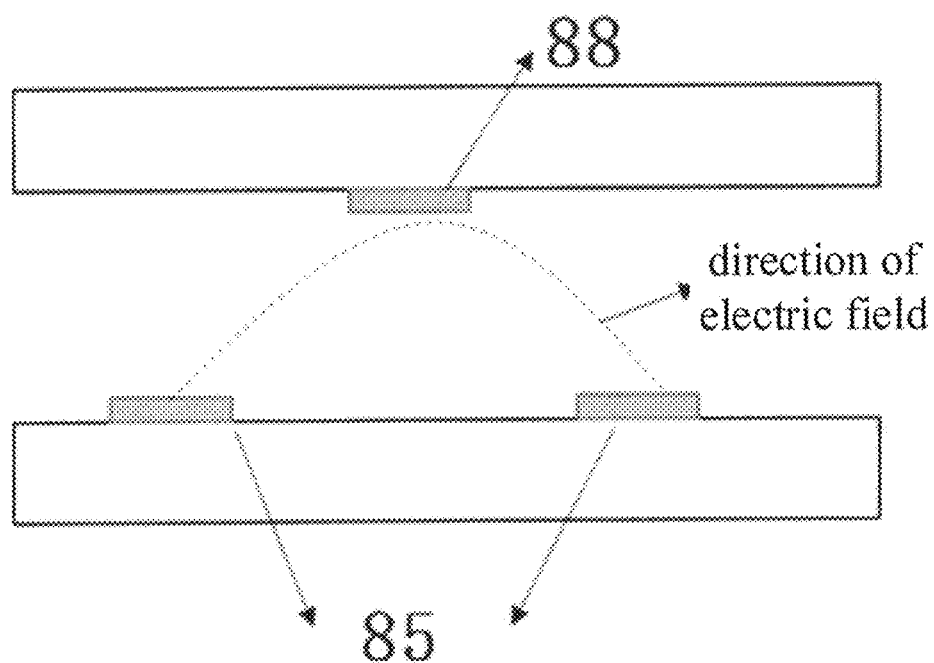
FIG. 13 is a schematic structural diagram of electrodes according to further another embodiment of the present disclosure.

In at least one embodiment of the present disclosure, the appearance of the electrode structure in the liquid crystal control electrode is not limited, and those skilled in the related art can flexibly select the appearance according to actual conditions. In some embodiments of the present disclosure, as shown in FIG. 12, the appearance of the electrode structure in the liquid crystal control electrode is able to be of a block structure, or as shown in FIG. 13, the appearance of the electrode structure is in a form to form vertical electric field, and for example the second electrode (common electrode) and the first electrode (pixel electrode) are opposite to each other on both sides of the liquid crystal layer to form the vertical electric field.

For the present disclosure, the following points should be noted:

(1) The accompanying drawings in the embodiments of the present disclosure only involve structures relevant to the embodiments of the present disclosure, and other structures may refer to the conventional design.

(2) For clarity, in the accompanying drawings of the embodiments of the present disclosure, the thickness of layers or regions is enlarged or reduced. That is, the accompanying drawings are not drawn according to actual scales.

(3) The embodiments of the present disclosure and the characteristics in the embodiments may be mutually combined without conflict.

The described above are only specific embodiments of the present disclosure, and the present disclosure is not limited thereto. The scope of the present disclosure is defined by the accompanying claims.

What is claimed is:

1. A display device, comprising:
   a light guide module, comprising a first major surface and a second major surface that are opposite to each other, first regions and second regions being defined on the first major surface;
   a polarization layer, disposed on a side of the first major surface away from the second major surface and comprising a plurality of polarizers disposed at intervals, an orthographic projection of the polarizers on the first major surface at least partially overlapping with the first regions;
   a light direction control section, disposed on a side of the polarization layer away from the light guide module; and
   a reflective layer, located on a side of the light direction control section away from the polarization layer,
   wherein light in the light guide module exits from the first regions of the first major surface, and the polarizers are configured to transmit light having a first polarization direction, and the light direction control section is configured to control a direction of light to adjust a passing amount of the light reflected by the reflective layer in the second regions and the light direction control section is configured to make the light reflected by the reflective layer have a second polarization direction substantially perpendicular to the first polarization direction after passing through the light direction control section,
   the light direction control section comprises a liquid crystal layer and a liquid crystal control electrode, and the liquid crystal control electrode is configured to make the liquid crystal layer form a liquid crystal grating after a voltage is applied through the liquid crystal control electrode such that the liquid crystal control electrode is configured as a planar electric field electrode structure, or as a vertical electric filed electrode structure including a first electrode and a second electrode on both sides of the liquid crystal layer,
   a product of a thickness and an optical anisotropy of the liquid crystal layer is one fourth of a wavelength of the light in guide module exited from the first regions of the first major surface; or
   the light direction control section further comprises a quarter-wave plate located between the polarization layer and the reflective layer.

2. The display device according to claim 1, wherein the first regions and the second regions are arranged in an array and disposed at intervals.

3. The display device according to claim 2, wherein the polarizers are disposed in a one-to-one correspondence with the first regions; and
   each of the first regions coincides with an orthogonal projection of one corresponding polarizer on the first major surface; or each of the first regions is located in an orthogonal projection of one corresponding polarizer on the first major surface.

4. The display device according to claim 2, wherein the display device comprises a plurality of pixel regions, each of the pixel regions comprises one non-display area corresponding to one of the first regions and two display areas corresponding to two of the second regions, and the non-display area is located between the two display areas in each of the pixel regions.

5. The display device according to claim 1, wherein the light guide module further comprises:
   a light guide plate, comprising two opposite major surfaces and a first side surface located between the two major surfaces, the two major surfaces being the first major surface and the second major surface respectively;
   a light supply section, disposed opposite to the first side surface to inject light into the light guide plate; and
   a light extraction layer, located on the first major surface or the second major surface, and configured to derive the light exited from the light supply section into the light guide plate.

6. The display device according to claim 5, wherein the light extraction layer comprises a plurality of light extraction units disposed at intervals, and orthographic projections of the light extraction units on the first major surface coincide with the first regions.

7. The display device according to claim 5, wherein the light extraction layer is a light extraction grating.

8. The display device according to claim 7, wherein the light extraction grating is a transmission grating and the transmission grating is located on the first major surface; or
   the light extraction grating is a reflection grating and the reflection grating is located on the second major surface.

9. The display device according to claim 7, wherein the light exited from the light extraction grating is polarized light, and the polarized light has the first polarization direction.

10. The display device according to claim 5, wherein the light extraction layer is configured to make a propagation direction of the light exited from the light guide plate be perpendicular to the first major surface.

11. The display device according to claim 5, wherein the light guide module further comprises: at least one total reflective layer, located on at least one selected from the group consisting of the first major surface and the second major surface.

12. The display device according to claim 5, wherein the light supply section further comprises: a side entry light source; and
a coupling grating, wherein the coupling grating is configured to adjust a propagation direction of the light exited from the side entry light source to make the light exited from the side entry light source be totally reflected in the light guide plate,
the coupling grating comprises a curved reflective mirror, and a shape of a sectional view of the curved reflective mirror in a direction perpendicular to the first major surface is a part of a parabola, and the side entry light source is located at a focus of the parabola.

13. The display device according to claim 12, wherein the side entry light source is a lambert light source, so that radiance brightness of the light emitted from the side entry light source does not change with the change of direction.

14. The display device according to claim 1, wherein the reflective layer comprises a plurality of reflective units disposed at intervals, and the reflective units are in one-to-one correspondence with the polarizers.

15. The display device according to claim 14, wherein an orthographic projection of each of the reflective units on the first major surface coincides with an orthographic projection of one corresponding polarizer on the first major surface; or an orthographic projection of each of the reflective units on the first major surface is located within an orthographic projection of one corresponding polarizer on the first major surface.

16. A display method of the display device according to claim 1, comprising:
a first display state, wherein the light having the first polarization direction that is exited from the first regions of the light guide module and transmitted through the polarizer is reflected by the reflective layer after passing through the light direction control section, and the light reflected by the reflective layer has the second polarization direction after passing through the light direction control section again and is directed toward the polarizer; and
a second display state, wherein the light direction control section is controlled to change the propagation direction of the light that is exited from the first regions of the light guide module and transmitted through the polarizer, and the light direction control section makes at least part of the light reflected by the reflective layer be directed to the second regions.

* * * * *